US010606730B2

(12) United States Patent
Vent

(10) Patent No.: US 10,606,730 B2
(45) Date of Patent: Mar. 31, 2020

(54) NETWORKED DIGITAL DATA PROCESSOR LOG FILE VIEWER

(71) Applicant: salesforce.com, Inc., San Francisco, CA (US)

(72) Inventor: Christian Vent, Jena (DE)

(73) Assignee: salesforce.com, inc., San Francisco, CA (US)

( * ) Notice: Subject to any disclaimer, the term of this patent is extended or adjusted under 35 U.S.C. 154(b) by 196 days.

(21) Appl. No.: 15/824,131

(22) Filed: Nov. 28, 2017

(65) Prior Publication Data

US 2019/0163610 A1    May 30, 2019

(51) Int. Cl.
  *G06F 11/36* (2006.01)
  *G06F 11/07* (2006.01)
  *H04L 29/06* (2006.01)

(52) U.S. Cl.
  CPC ...... *G06F 11/3636* (2013.01); *G06F 11/0706* (2013.01); *G06F 11/079* (2013.01); *G06F 11/0751* (2013.01); *G06F 11/0778* (2013.01); *H04L 67/42* (2013.01)

(58) Field of Classification Search
  CPC ............. G06F 11/3636; G06F 11/0706; G06F 11/0751; G06F 11/0778; G06F 11/079; H04L 67/42
  USPC ........................................................ 717/131
  See application file for complete search history.

(56) References Cited

U.S. PATENT DOCUMENTS

| 8,769,518 | B1* | 7/2014 | Daudel | G06F 9/455 717/166 |
| 2004/0054695 | A1* | 3/2004 | Hind | G06F 11/3636 |
| 2005/0114771 | A1* | 5/2005 | Piehler | G06F 17/21 715/264 |
| 2005/0138111 | A1* | 6/2005 | Aton | G06F 11/3476 709/201 |
| 2005/0223048 | A1* | 10/2005 | Smith | G06F 9/466 |
| 2010/0281107 | A1* | 11/2010 | Fallows | G06F 9/54 709/203 |
| 2012/0233600 | A1* | 9/2012 | Uno | G06F 11/3636 717/128 |
| 2013/0152064 | A1* | 6/2013 | Gagliardi | G06F 9/44521 717/166 |

(Continued)

OTHER PUBLICATIONS

Muzso, Debugging Tomcat Class Loading Issues, Muzso.hu (Published Mar. 17, 2009) retrieved from Monhttp://muzso.hu/2009/03/17/debugging-tomcat-class-loading-issues on Aug. 19, 2019.*

(Continued)

*Primary Examiner* — Lewis A Bullock, Jr.
*Assistant Examiner* — Theodore E Hebert
(74) *Attorney, Agent, or Firm* — Morris & Kamlay LLP

(57) ABSTRACT

A server digital data processor includes an application server providing an execution environment in which a web application comprising a plurality of classes or functions (collectively, "classes") executes. The application server or execution environment generate a log file entry identifying an error in connection with execution of a class and store that message to a log file. A log file viewer executing on the server digital data processor augments the log file entry to include a link or other reference to a source file in a repository maintained on a remote workstation or server containing source code to the offending class and application version.

19 Claims, 2 Drawing Sheets

(56) References Cited

U.S. PATENT DOCUMENTS

2014/0380101 A1* 12/2014 Yu ................... G06F 11/3636
714/38.1
2019/0163610 A1* 5/2019 Vent .................. G06F 11/3636

OTHER PUBLICATIONS

Rusina, A., "Analyzing External Stack Traces," IntelliJ Idea Blog, posted Aug. 29, 2006; <https://blogjetbrains.com/idea/2006/08/analyzing-external-stack-traces/>.

* cited by examiner

NETWORKED DIGITAL DATA PROCESSOR LOG FILE VIEWER

BACKGROUND

Field of Technology

This pertains to networked digital data processing systems and, more particularly, by way of example, to web application development and execution on such systems.

In the development of web applications, the software developer often relies on (i) a local development workstation (or "development platform") on which to write original and new versions of an application, and (ii) a remote production server (or "production platform") on which to make the application available to end users over the web. Depending on the development lifecycle, the developer may rely on remote testing, staging, other intermediate or production server 12 to facilitate testing of the application on its way from development to production. The foregoing applies not only to e-commerce applications, but also to other web applications, e.g., of the type employed in large enterprises.

Development platforms do not accommodate debugging web applications as they move from the development platform to the remote platforms in the lifecycle. There are, for example, no ready tools to identify in the developer's source code repository the source of bugs that come to light when that code is uploaded over the internet (or other network) to the remote production, sandbox, staging or other servers and integrated with other code (and data sets) there.

BRIEF DESCRIPTION OF THE DRAWINGS

A more complete understanding may be attained by reference to the drawings, in which.

DETAILED DESCRIPTION OF THE ILLUSTRATED EMBODIMENT

Figure 1:
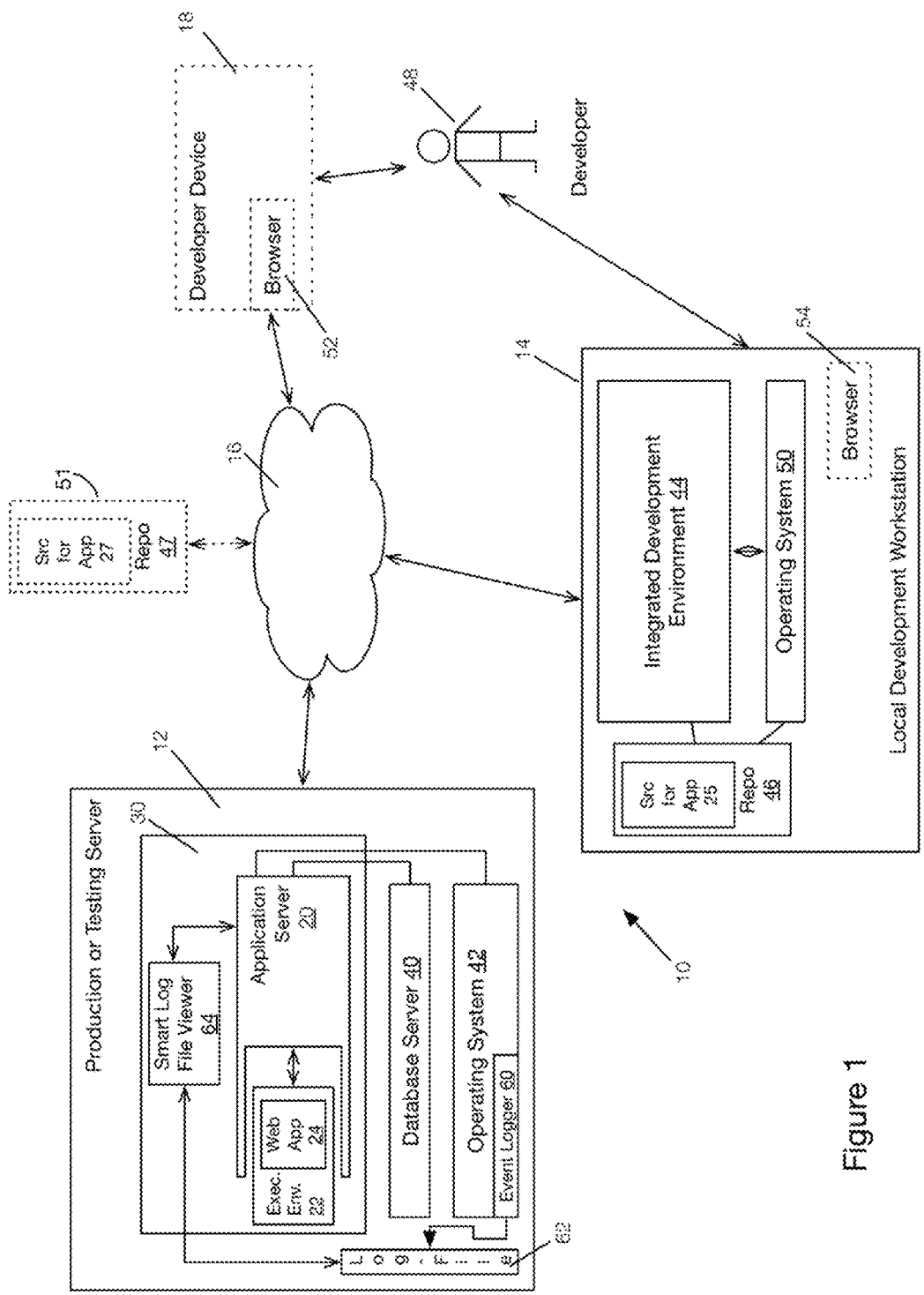
FIG. 1 depicts an illustrative embodiment.

FIG. 1 depicts an illustrative embodiment of a system 10 that includes server digital data device ("server") 12 that is coupled to a developer workstation 14 via a network 16. In some embodiments, a developer device 18 may also be coupled to workstation 14 and server 12 via network 16. Devices 12, 14, 18 comprise conventional desktop computers, workstations, minicomputers, laptop computers, tablet computers, PDAs, mobile phones or other digital data devices of the type commercially available in the marketplace, all as adapted in accord with the teachings hereof. One or more of those devices may be configured as and/or to provide a database system (including, for example, a multi-tenant database system) or other system or environment, and the devices 12, 14, 18 may be arranged to interrelate in a peer-to-peer, client-server or other protocol consistent with the teachings hereof.

Each device 12, 14, 18, comprises central processing, memory, and input/output subsections (not shown) of the type known in the art and suitable for (i) executing software of the type known in the art (e.g., applications software, operating systems, and/or middleware, as applicable) as adapted in accord with the teachings hereof and (ii) communicating over network 16 to one or more of the other devices 12, 14, 18 in the conventional manner known in the art as adapted in accord with the teachings hereof.

Network 14 comprises one or more networks suitable for supporting communications between server 12, workstation 14 and developer device 18. The network comprises one or more arrangements of the type known in the art, e.g., local area networks (LANs), wide area networks (WANs), metropolitan area networks (MANS), and or Internet(s).

With reference to illustrated server 12, application server 20 that executes on that device provides an execution environment 22 in which web application 24 executes. Application server 20 comprises conventional such software known in the art (as adapted in accord with the teachings hereof) providing libraries and other reusable services that are (or can be) employed—e.g., via an applications program interface (API) or otherwise—by multiple and/or a variety of web applications, one of which is shown here (to wit, web application 24). Execution environment 22 comprises a conventional such software environment in which a web application (e.g., 24) executes on a digital data processing system, here, server 12 and within application server 20. In instances, as here, where the web application 24 is Java or Javascript, the execution environment 22 includes inter alia a Java virtual machine (not shown). Web application 24 comprises conventional such software known in the art (as adapted in accord with the teachings hereof) for effecting specific behavior by the server 12 in response to requests from the workstation 14 at the behest of users thereof.

Together, application server 20, execution environment 22 and web application 24 function as a web server 30 that responds to requests in HTTP or other protocols for transferring web pages, downloads and other digital content to a requesting device, e.g., developer workstation 14 and/or developer device 18, over network 16—all in the conventional manner known in the art as adapted in accord with the teachings hereof. That digital content may be generated wholly from within the web server and, more typically, from within web application 24, though, it may include content sourced from elsewhere, e.g., a database server 40 or file system (that forms part of operating system 42) executing on and/or coupled to device 12, again, in the conventional manner known in the art as adapted in accord with the teachings hereof.

Though referred to here as a web server, in other embodiments application server 20, execution environment 22 and web application 24 may define other functionality suitable for responding to client requests for transferring digital content to the requestor over the network 16, e.g., a video server, a music server, or otherwise. And, though shown and discussed here as comprising an application server 20, execution environment 22 and web application 24, in other embodiments the web server 30 may combine the functionality of those in a single component or distribute it among still more components.

Workstation 14 of the illustrated embodiment provides a development platform of the type known in the art, as adapted in accord with the teachings hereof, that facilitates the creation and modification by developer 48 of source code modules/files that make up a web application. This is also shown at step 100 of FIG. 2, which is a flowchart depicting operation of the embodiment of FIG. 1 and references to which figure accompany the following discussion of the architecture of that embodiment.

Referring again to FIG. 1, the development platform provided by workstation 14 includes an integrated development environment (IDE) 44 of the type known in the art (such as, for example, Eclipse), as adapted in accord with the teachings hereof, that can include a source code editor, compiler/interpreter, and debugger, (again, of the type known in the art as adapted in accord with the teachings hereof), among other features. In other embodiments, the IDE 44 may be less well-featured, e.g., including only a source code editor. The IDE 44 is coupled to a source code repository ("repo") 46 of the type known in the art, as adapted in accord with the teachings hereof, that stores current and, typically, prior versions of web application source code. In the illustrated embodiment, that includes current and prior versions of the source code 25 of the web application 24 that executes on server 12.

In some embodiments, the code base maintained in repository 46 on workstation 14 is a local copy of a master code base maintained in repository 47 hosted on a remote server 51. That server 51 can be a desktop computer, workstation, minicomputer, or other digital data device of the type commercially available in the marketplace, as adapted in accord with the teachings hereof. Such a server 51 may be configured as and/or to provide a database system (including, for example, a multi-tenant database system) or other system or environment, and it may be arranged to interrelate with devices 12, 14, 18 in a peer-to-peer, client-server or other protocol consistent with the teachings hereof. The server 51 and/or repository 47 can include a web or other interface of the type known in the art, as adapted in accord with the teachings hereof, to facilitate synchronization of its master code base (including of source code 27 corresponding to local source code 25) with the local code base on workstation 14, and to facilitate developer 48 maintenance of the master code base.

Current versions of web applications (e.g., web application 24) or portions thereof (e.g., individual modules/files 25, 27 forming part of a larger web application) developed and/or modified on workstation are uploaded to server 12 in the conventional manner known in the art, as adapted in accord with the teachings hereof. See also, FIG. 2, step 102. This can be, by way of non-limiting example, through automatic or developer-requested action of IDE 44, of a file transfer tool forming part of operating system 50 of workstation 14, of an import facility native to web server 30, or otherwise, all in the conventional manner known in the art, as adapted in accord with the teachings hereof. Such upload can, moreover, be on a module-by-module (a/k/a file-by-file) basis, e.g., as individual modules/files are developed or modified, on an application-by-application basis, or otherwise, as per convention in the art, as adapted in accord with the teachings hereof. While those uploads can include source code for newly developed or modified modules, they typically include (as in the case of the illustrated embodiment) compiled code or other intermediate code forms generated, e.g., by IDE 44, from the current version of the source code maintained in repository code 46, all as per convention in the art as adapted in accord with the teachings hereof. Once uploaded, executables of the web application 24 source code or portions thereof (e.g., file 25, 27) can be linked or otherwise integrated into an existing web application code base, if any, on the web server 30 as part of a "build" for execution in environment 22, all in the conventional manner known in the art as adapted in accord with the teachings hereof. See also, FIG. 2, steps 104, 106.

In embodiments in which it is provided, developer device 18 executes web browser 52 that typically operates under developer or other user control to generate requests in HTTP or other protocols for web pages, downloads and other digital content, that transmits those requests to web server 30 over network 14, and that presents content received from the server application 30 to the user—all in the conventional manner known in the art as adapted in accord with the teachings hereof. Though referred to here as a web browser, in other embodiments application 52 may comprise other functionality suitable for transmitting requests to web server 30 and/or presenting content received therefrom in response to those requests, e.g., a dedicated client app. As an alternative and/or in addition, workstation 14 of the illustrated embodiment can provide like functionality via web browser or client app 54.

Digital data processor 12 and, more particularly, by way of example, operating system 42, provides an event logger 60 of the type known in the art that logs to file 62 event entries messaged by the operating system 42 and/or other software executing on the device 12. This can be event-logging functionality native to the operating system such as syslog and/or other event-logging functionality provided by middleware or other software (e.g., web application 24) executing on the device 12, all as per convention and as adapted in accord with the teachings hereof.

Application server 20 and/or environment 24 generate and message such event entries to logger 60 for logging to file 62, e.g., when errors or other events (collectively, "errors") occur in connection with execution of web application 24 in the conventional manner known in the art as adapted in accord with the teachings hereof. See also, FIG. 2, step 108. In embodiments in which the execution environment 22 executes a web application 24 composed of JAVA or other object-oriented or object-based languages, each log file entry identifies the error, the class and/or function (hereinafter, without loss of generality, "class") in which that error occurred, and the line number of the class-defining code most closely associated with the error (a/k/a the "line number of the error"), all per convention in the art as adapted in accord with the teachings hereof. Alternatively or in addition, error log entries providing corresponding information—e.g., error, function name, subroutine name, and offending code snippets—can be generated and messaged by the application server 20 and/or environment 24 in embodiments executing web applications in JAVA and other languages, whether or not object-oriented.

Smart log file viewer 64 executes on device 12 within and/or, as illustrated, in connection with, application server 20, as part of web server 30. The viewer 64 operates in the manner of a web application to cause the web server 30 to generate augmented error log entries from log file 62 for transmission by server 30, e.g., as HTML pages, file downloads or otherwise, to workstation 14, developer device 18, or other requesting devices. See also, FIG. 2, step 110. This can be, by way of nonlimiting example, as part of an interactive session between server 30 and those devices—and, more particularly, for example, a browser 52, 54 or other software (collectively, "client viewer") executing thereon—in response to requests received from them for access to the log file 62, those error log entries or otherwise.

The log file viewer 64 augments error entries in file 62 by adding to the information already in them (e.g., error identification, name of class in which the error occurred and the line number of the error) a hypertext link (and/or, in other embodiments, other references) to the source code file 25 in the repository on the remote digital data processor—e.g., repository 46 maintained on the development workstation 14 or, in embodiments that provide for it, to the source code file 27 in repository 47 on server 51—associated with version of the web application 24 and the class in which the error reported in that log error entry occurred. The browser or other client viewer to which those entries are transmitted can display the augmented log file entries to the developer 48 or other user, and automatically and/or on user command, can access for display and editing (or other operation) the source code file 25 in repository 46 (or, where provided, the source code file 27 in repository 47) that contains the code for the class with which error is associated. See also, FIG. 2, steps 112, 114. Source code files 24 modified by the developer 48 can be re-uploaded to the server 12 for build and execution, repeating process discussed above, as indicated in FIG. 2.

Figure 2:
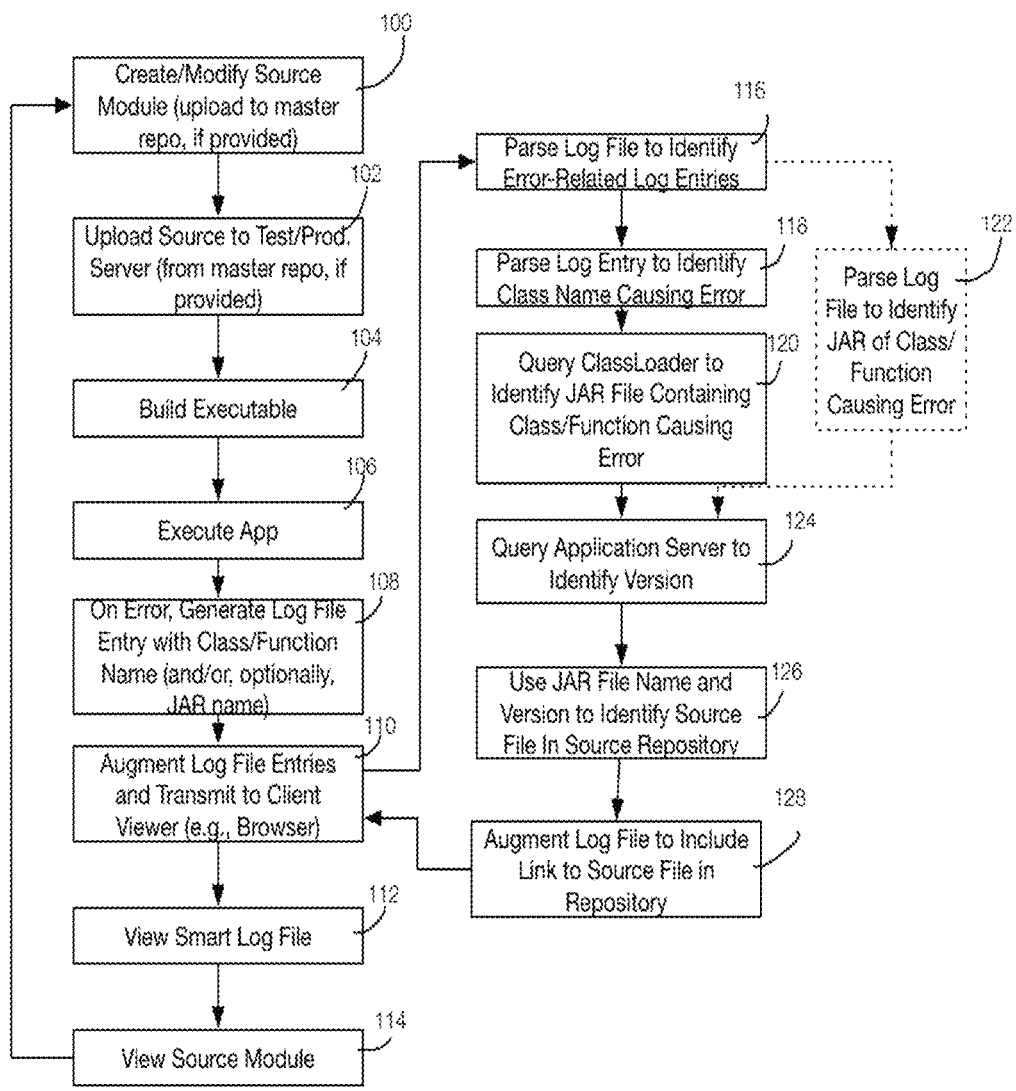
FIG. 2 depicts operation of an embodiment of the type shown in FIG. 1.

Operation of the system 10, and more particularly of the server 12, is depicted in FIG. 2 and is discussed, in part, in parallel with the system architecture above. By way of summary and with reference to the more detailed discussion above, source code files such as module 25 created or modified by the developer 48 on developer workstation 14 (step 100) are uploaded to a testing, staging, other intermediate or production server 12 (step 102) where they are built into an executable web application 24 (step 104). In embodiments that provide a remote master code base repository 47, step 100 contemplates uploading code created/modified by the developer from the local repository 46 on workstation 14 to the master repository 47 on server 51 and, from there, uploading the new/modified code to the testing, staging, other intermediate or production server 12 in step 102. On execution of that application 24 (step 106), errors (and other events) result in generation of entries that are logged to file 62 (step 108) and that reflect the nature of the error, the class and line at which it occurred. A smart log file viewer augments those entries (step 110) to include links or other references to the source code file on development workstation 14—or, alternatively, in embodiments that provide a master repository 47, to the source code file 27 on server 51—where the source code for that class (and line) of the version of the application 24 in which the error occurred can be found. A developer or other user viewing that log file (step 112) on the client viewer can view that source code (step 114) and modify it for re-upload and re-build into a next version of the web application 24.

The foregoing avoids the necessity of the developer's having to recall or guess how error log entries generated on server 12 vis-à-vis a web application 24 executing on it map to source code file 25, 27 residing in a repository 46, 47 on a digital data processor 14, 51 that is networked to and/or remotely disposed from the server 12—a task that can be error prone and time consuming, particularly, where the server-generated error log entries relate to versions of the web application 24 that predate the most current version of the workstation-resident source code 25 and/or the master repository-resident source code 27. Through their hypertext links (or other references), the augmented error log entries generated by the viewer 64 associate the underlying error information directly to offending lines of application source code 25, 27. Presented with that (e.g., by the client viewer software and/or IDE 44), the developer 48 can modify the offending code on the workstation 14 (e.g., after synchronizing it with the code base in the master repository 47, in embodiments that provide for such) for re-upload to the server 12 for further testing, staging or deployment.

A further understanding the steps taken by log file viewer 64 to augment log file entries (step 110), may be attained by continued reference to FIG. 2.

In step 116, the viewer 64 parses the log file 62 to identify error (or other event) entries pertaining to execution of web application 24. Such parsing can be performed in the conventional manner known in the art, as adapted in accord with the teachings hereof, to identify entries in the file 62 referencing the web application 24 and, depending upon specifics of the implementation, error (or other event codes) of potential relevance in connection therewith.

In step 118, the log file viewer 64 parses entries identified in step 116 to identify the name of the JAVA (or other object-oriented) class in which the error occurred. In embodiments executing other languages, whether or not object-oriented, parsing can be for corresponding alternative information, such as function name, subroutine name, and so forth. Regardless, such parsing can be performed in the conventional manner known in the art, as adapted in accord with the teachings hereof.

In step 120, the log file viewer 64 queries the JAVA ClassLoader of the application server 20 (or corresponding functionality in embodiments executing other languages) to identify the name of the archive file (e.g., JAVA archive (JAR) file) that contained the class which cause the error. This can be done in the conventional manner known in the art, as adapted in accord with the teachings hereof, e.g., by utilizing an API, command-line or other invocation of the ClassLoader (or the like).

In embodiments, where the application server 20 provides the name of the archive (e.g., JAR) file with the error log entries, the log file viewer 64 can retrieve that name by parsing the entry, instead or in addition to querying the ClassLoader. See step 122. As above, such parsing can be performed in the conventional manner known in the art, as adapted in accord with the teachings hereof.

In step 124, the log file viewer 64 queries the application server 20 for the version of the web application 24 that was executing at the time of the error. This can be done in the conventional manner known in the art, as adapted in accord with the teachings hereof, e.g., by utilizing an API, command-line or other invocation of the application server 20.

In step 126, the log file viewer 64 uses the archive file name (from steps 120 or 122) and the version number (from step 124) to identify the name and path of the source code file 25 residing in repository 46 on the development workstation 14 (or, in embodiments that provide for it, to file 27 in master repository 47 on server 51) containing the offending class of the offending version of the web application 24. This can be done in the conventional manner known in the art, as adapted in accord with the teachings hereof, e.g., by utilizing an API or other call to the repository 46, to search it for source file(s) pertaining to the implicated archive file and version.

In step 128, the log file viewer 64 augments the log file by including with the error log file entry being parsed a link or other reference to the name and path of the source code file 25, 27 identified in step 126. This can be performed by modifying the log file itself, though, in the illustrated embodiment it is performed by generating a web page, downloadable file or the like that includes the original error log file entry, augmented by the link or other reference. The log file, web page, or downloadable file can then be transmitted to the requesting device 14, 18 per step 110, discussed above.

Described above are systems, servers and methods meeting the objects set forth above. It will be appreciated that the embodiments described above and shown in the drawings are merely examples of the invention, and that other embodiments varying from those here fall within the scope thereof.

What I claim is:

1. A system comprising:
   a server including a hardware processor and a memory comprising:
   an application server executing on the hardware processor of the server to provide an execution environment in which a web application comprising at least one of a class or function, at least one of the execution environment and the application server to generate a log file entry identifying an error in the at least one class and storing that entry to a log file maintained in a store in the memory of the server, a log file viewer executing on the hardware processor and coupled with the store, the log file viewer (i) to parse the log file to identify the log file entry identifying the error, and (ii) to parse that log file entry to identify a name of the class based on the error, in response to identifying the name of the class based on the error, the log file viewer coupled to the application server to query a classloader executing on the application server to identify an archive file containing the class based on the error, in response to identifying the archive file containing the class based on the error, the log file viewer coupled to the application server to query the application server to identify a version of the web application based on the error, in response to identifying the archive file and the version of the web application, the log file viewer coupled to the application server to query a repository maintained on a remote digital data processor to identify a name and path of a source file in the repository, wherein the source file contains the class based on the error and the identified version of the web application, in response to identifying the name and path of the source file in the repository, the log file viewer to generate a link to the source file in the repository, the log file viewer to generate and transmit to a client viewer an augmented log file entry identifying the error, and including the class name, the application version, and the link to the source file based on a received request at the server.

2. The system of claim 1, wherein the log file viewer generates the at least one of the link and a reference to the repository on any of a development digital data processor and a repository server that is coupled to the server.

3. The system of claim 2, where the log file viewer generates the at least one of the link and the reference to the repository on at least one of the development digital data processor and the repository server that is remotely disposed from the server.

4. The system of claim 1, wherein the server further comprises:
the classloader is executed on the hardware processor and is communicatively coupled with the log file viewer,
the log file viewer to query the classloader with the class name to identify an archive file containing the class based on the error.

5. The system of claim 1, wherein the log file viewer identifies the source file based on a name of the archive file.

6. The system of claim 1, wherein at least one of the execution environment and the application server generate the log file entry identifying the archive file containing the class based on the error.

7. The system of claim 1, wherein the log file viewer transmits the augmented log file entry to the client viewer executing on at least one of the hardware processor and a further digital data processor that executes the client viewer.

8. The system of claim 1, wherein the server includes at least one from a group consisting of: a testing server, a staging server, an intermediate server, and a production server, and wherein the development digital data processor comprises a development workstation.

9. The system of claim 1, wherein the log file viewer generates the augmented the log file entry to identify lines of code in the source file based on the error.

10. The system of claim 1, wherein the server receives modified source code with the identified error removed to be executed by the application server.

11. A method of operating a server that includes a hardware processor and memory, comprising:
executing an application server on the hardware processor of the server, the application server providing an execution environment in which a web application comprising at least one class or function executes,
generating, with at least one of the execution environment and the application server, a log file entry identifying an error in connection with execution of said the at least one class and storing that message to a log file maintained in a store in the memory of the server,
executing a log file viewer on the hardware processor of the server, the log file viewer (i) parsing the log file to the error and (ii) parsing that log file entry to identify a name of the at least one class based on the error,
in response to identifying the name of the at least one class based on the error, querying, with the log file viewer, a classloader executing on the application server to identify an archive file containing the at least one class based on the error,
in response to identifying the archive file containing the at least one class based on the error, querying, with the log file viewer, the application server to identify a version of the web application based on the error,
in response to identifying the archive file and the version of the web application, querying, with the log file viewer, a repository maintained on a remote digital data processor to identify a name and path of a source file in the repository, wherein the source file contains the at least one class based on the error and the identified version of the web application,
in response to identifying the name and path of the source file in the repository, generating, with the log file viewer, a link to a source file in the repository,
generating, with the log file viewer, an augmented log file entry identifying the error and including the class name, the application version, and the link to the source file based on a received request at the server, and transmitting augmented log file entry to a client viewer.

12. The method of claim 11, wherein the generating the link includes:
generating at least one of the link and a reference to the repository on any of a development digital data processor and a repository server that is remotely disposed from the server.

13. The method of claim 11, further comprising:
executing the classloader on the server, and
querying, with the log file viewer, the classloader with the class name to identify the archive file containing the class based on the error.

14. The method of claim 11, further comprising:
identifying, with the log file viewer, the source file based on a name of the archive file.

15. The method of claim 11, further comprising:
generating, with at least one of the execution environment and the application server, the log file entry identifying the archive file containing the at least one class based on the error.

16. The method of claim 11, further comprising:
transmitting, with the log file viewer, the augmented the log file entry to the client viewer executing on at least one of the development digital data processor and a further digital data processor on which the client viewer executes.

17. The method of claim 11, wherein the server at least one from the group consisting of: a testing server, a staging server, an intermediate server, and a production server, and the development digital data processor comprises a development workstation.

18. The method of claim 11, further comprising:
generating, with the log file viewer, the augmented the log file entry to additionally identifying lines on which the error occurred.

19. A non-transitory computer readable storage medium having stored thereon a computer program configured to cause a server including a hardware processor and memory to perform the method of:
executing a log file viewer on the server to (i) parse a log file stored on the computer to identify a log file entry identifying an error based on execution of a web application executing on the computer and (ii) parse that log file entry to identify a name of a class in which that error occurred,
in response to identifying the name of the class based on the error, with the log file viewer, querying a class-loader executing on an application server in which the web application executes on the server to identify an archive file containing the class based on the error,
in response to identifying the archive file containing the class based on the error, with the log file viewer, querying the application server to identify a version of the web application based on the error,
in response to identifying the archive file and the version of the web application, with the log file viewer, querying a repository maintained on a remote digital data processor to identify a name and path of a source file in the repository, wherein the source file contains the class based on the error and the identified version of the web application,
in response to identifying the name and path of the source file in the repository, with the log file viewer, generating a link to a source file in the repository,
with the log file viewer, generating an augmented the log file entry identifying the error and including the class name, the application version, and the link to the source file based on a received request at the server, and transmitting augmented log file entry to a client viewer.

* * * * *